United States Patent [19]

Hashimoto

[11] Patent Number: 4,971,465
[45] Date of Patent: Nov. 20, 1990

[54] KEYBOARD FOR USE IN AN INFORMATION PROCESSING DEVICE

[76] Inventor: Yoshiro Hashimoto, 14-9, Tateno cho, Nerima-ku, Tokyo, Japan

[21] Appl. No.: 244,886

[22] Filed: Aug. 15, 1988

Related U.S. Application Data

[63] Continuation-in-part of Ser. No. 887,718, Jul. 18, 1986, abandoned.

[30] Foreign Application Priority Data

Jul. 18, 1985 [JP] Japan ................................. 60-156991
Jul. 18, 1985 [JP] Japan ................................. 60-156992

[51] Int. Cl.$^5$ .............................................. B41J 5/28
[52] U.S. Cl. ..................................... 400/485; 400/489; 400/472
[58] Field of Search ............ 400/477, 478, 479, 479.2, 400/484, 485, 486, 488, 489, 490, 492, 493, 494, 495, 87, 88, 100–102, 472–476; 340/711, 712; 341/22; 178/17 A, 17 R, 17 C

[56] References Cited

U.S. PATENT DOCUMENTS

| | | | |
|---|---|---|---|
| 3,022,878 | 2/1962 | Seibel et al. | 400/479 |
| 4,201,489 | 5/1980 | Zapp | 400/485 |
| 4,564,751 | 3/1985 | Alley et al. | 235/146 |
| 4,833,446 | 5/1989 | Eilam et al. | 341/22 |

FOREIGN PATENT DOCUMENTS 487101  6/1918  France ................................. 341/22

OTHER PUBLICATIONS

IBM Technical Disclosure, A. Uchiyama, "KANA Keyboard with Palm Rest" Feb. 1983, pp. 4915–4916, vol. 25, No. 9.

Xerox Technical Disclosure Journal, D. C. Kowalski, "Semi–Captive Keyboard" Feb. 1976, p. 85, vol. 1, No. 2.

IBM Technical Disclosure Bulletin, D. C. Conway, "Digital X Typewriter Keyboard", pp. 4187–4190, vol. 18, No. 12.

Primary Examiner—Edgar S. Burr
Assistant Examiner—Joseph R. Keating
Attorney, Agent, or Firm—Wenderoth, Lind & Ponack

[57] ABSTRACT

A keyboard operable with one hand includes a plurality of keys arranged on a keyboard base so as to be opposite to the fingertips of the operator's hand in a naturally spread state and each having switching contacts which are selectively engaged by moving the operator's fingers. Therefore, it is possible to impart many kinds of key signals with a simple operation.

8 Claims, 6 Drawing Sheets

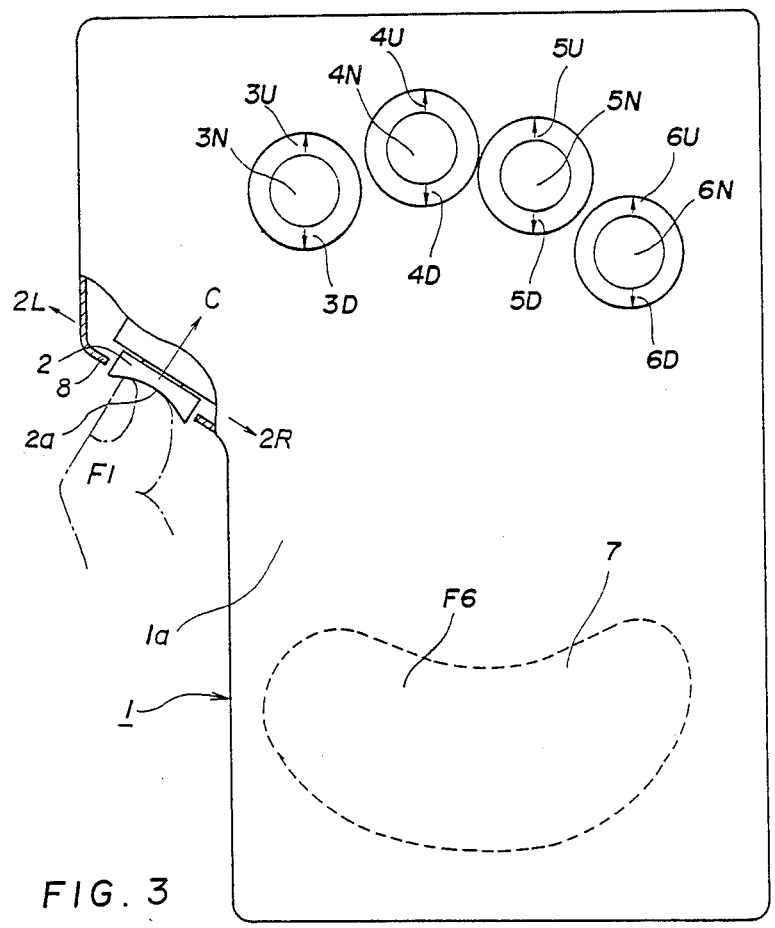
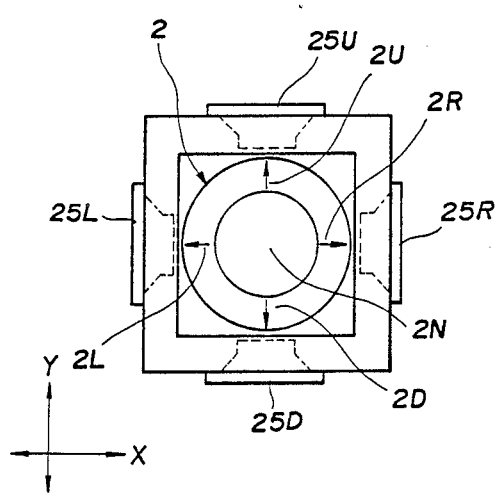
FIG. 3

KEYBOARD FOR USE IN AN INFORMATION PROCESSING DEVICE

This application is a Continuation-In-Part of U.S. patent application Ser. No. 887,718 filed on July 18, 1986 now abandoned.

BACKGROUND OF THE INVENTION:

1. Field of the Invention

This invention relates to a keyboard for use in an information processing device such as a word processor and computer, which is capable of readily inputting data or programs to the information processing device by keying operations and is based on human engineering, and particularly to a keyboard having key arrangement which permits keys disposed thereon to be readily operated by naturally moving the fingertips of the operator's hand in a physiological resting position on a keyboard base without the smallest strain.

2. Description of the Prior art:

Characters such as capital and small letters, numerals and marks to be used in writing a composition in English do not exceed 100. There has widely spread a universal keyboard having four rows of ten or more keys to input many kinds of key signals to an information processing device such as a word processor. Much practice is required to handle the universal keyboard with quickness and dexterity. However, even a skilled operator becomes fatigued while performing keying work for a long time, because the keying operation requires large momentum of the operator's fingers. Though the keying operation for making an English composition is performed in such a manner as noted above, the conventional universal keyboard makes it impossible to readily input language such as Japanese which has as many as at least 200 kinds of characters including kana characters, alphabets, numerals, marks, etc. necessary for making a Japanese composition.

There have been hitherto proposed a variety of keyboards capable of easily inputting a large number of key signals by operating a small number of keys. By way of example, U.S. Pat. No. 4,584,443 discloses a portable keyboard having multi-contact switches disposed opposite to the corresponding fingertips of an operator on a keyboard base. In this keyboard, the keys each have a cap-like profile so that the operator's fingers can be inserted in the cap-like keys to operate the keys.

Also in U.K. patent application Public Disclosure No. 2,076,743(A), a keyboard having curved recesses in which the operator's fingers can rest has been proposed.

Furthermore, Japanese patent application Public Disclosure SHO No. 59-140548(A) has proposed a keyboard in which adjacent keys are pressed at one time to enter a specific key signal without straining the operator's hand. And, patent application Public Disclosure SHO No. 59-98264(A) discloses a portable keyboard which can be held and handled with one hand and adopts an ergonomic key arrangement. This keyboard is small so that it can be held and operated with one hand, and is provided with five keys arranged on a keyboard proper so as to be opposite to the respective fingertips of the operator's hand.

The conventional keyboards including the aforementioned prior art are constructed for the purpose of inputting various information data with simple movements of the fingers of an operator. However none of the conventional keyboards are provided with a key arrangement based on human engineering in consideration of a physiological resting position of the hand and fingers. As is medically defined, a physiological limb state in which the muscles of the hand and fingers are completely relaxed is generally referred to as the "resting position". There has heretofore not been a keyboard which can be operated with the natural and free movements of the hand and fingers which are maintained in the physiological resting position without straining the muscles of the hand and fingers. In the physiological resting position of the hand, the fingers other than the thumb are bent inward and slightly spread out, and the thumb points to the fingertip of the index finger in such a state that the finger pad thereof is directed inward, so that the palm of the hand defines a substantially semi-spherical hollow space. With this in mind, the keyboard disclosed in U.S. Pat. No. 4,584,443 has thumb keys with thumb holes separated from the keys for the fingers other than the thumb. When the thumb is set in the thumb hole formed in the thumb key and the other fingers rest on the other keys, the thumb is forced to assume the radial abduction state in which the thumb is extended so as to be perpendicular to the other fingers. With this keyboard, the operator becomes fatigued while performing keying work because the hand and fingers cannot assume their physiological resting position. Also, none of the prior art including U.K. patent application Pub. Discl. No. 2,076,743(A), are aimed at allowing the hand and fingers during a keying operation to assume the physiological resting position and thus can in no way be said to facilitate keying work based on human engineering. Furthermore, hitherto there has not been a keyboard capable of being fitted to hands of different sizes so as to allow every different size hand to assume the physiological resting position during a keying operation.

OBJECT AND SUMMARY OF THE INVENTION

The present invention was made in view of the drawbacks of the past described above. It is an object of present invention to provide a keyboard for use in an information processing device which is capable of effecting a high-speed keying operation with ease in which many kinds of key signals are entered by operating a small number of keys while the hand and fingers assume the physiological resting position. Another object of the present invention is to provide one-sized keyboard capable of allowing different size hands to assume the physiological resting position.

In order to achieve the object described above according to the present invention, there is provided a keyboard for use in an information processing device, which comprises a keyboard base provided on its upper surface with an index-finger key, a middle-finger key, a ring-finger key and a little-finger key, the keys being disposed in a common plane and in a chevron with the middle-finger key disposed at the apex of the chevron, and a thumb key disposed on a surface other than that on which the keys other than the thumb key is disposed, which thumb key is placed close to the index-finger key and has a keytop having an orthogonal center line directed substantially to the index-finger key.

When the fingers of an operator are put in the corresponding key positions, the hand and fingers assume a physiological resting position so that the keying operation can be naturally carried out without straining the operator's hand. Namely, the physiological resting position of the operator's hand and fingers can be maintained only by allowing the fingertips to lightly touch the keytops of the corresponding keys. In the resting position in which the hand and fingers of the operator are completely relaxed, the fingertips can be moved without the smallest strain by subjecting the fingers other than the thumb to extension or flexion and the thumb to radial abduction, adduction, palmar abduction or retroposition, thereby enabling a plurality of key signals to be inputted by each key. Such swinging motions as noted above of the fingers of the operator's hand in the physiological resting position can be smoothly and readily carried out without straining the hand and fingers.

The keys other than the thumb key may be movable in the longitudinal and lateral directions so as to be adaptable to every hand of a different size, whereby the keys on the keyboard can be easily operated with hands of different sizes only by slightly moving the fingertips without the smallest strain, so that the hand and fingers of the operator can assume approximately the physiological resting position.

BRIEF DESCRIPTION OF THE DRAWINGS

A more complete appreciation of the invention and many of the attendant advantages thereof will be readily understood by referring to the following detailed description in connection with the accompanying drawings, wherein:

FIG. 2 is an explanatory diagram schematically illustrating the key arrangement of the keyboard of FIG. 1;

FIG. 3 is an explanatory diagram illustrating a thumb key on the keyboard of FIG. 1;

DETAILED DESCRIPTION OF THE PREFERRED EMBODIMENTS

Figure 1:
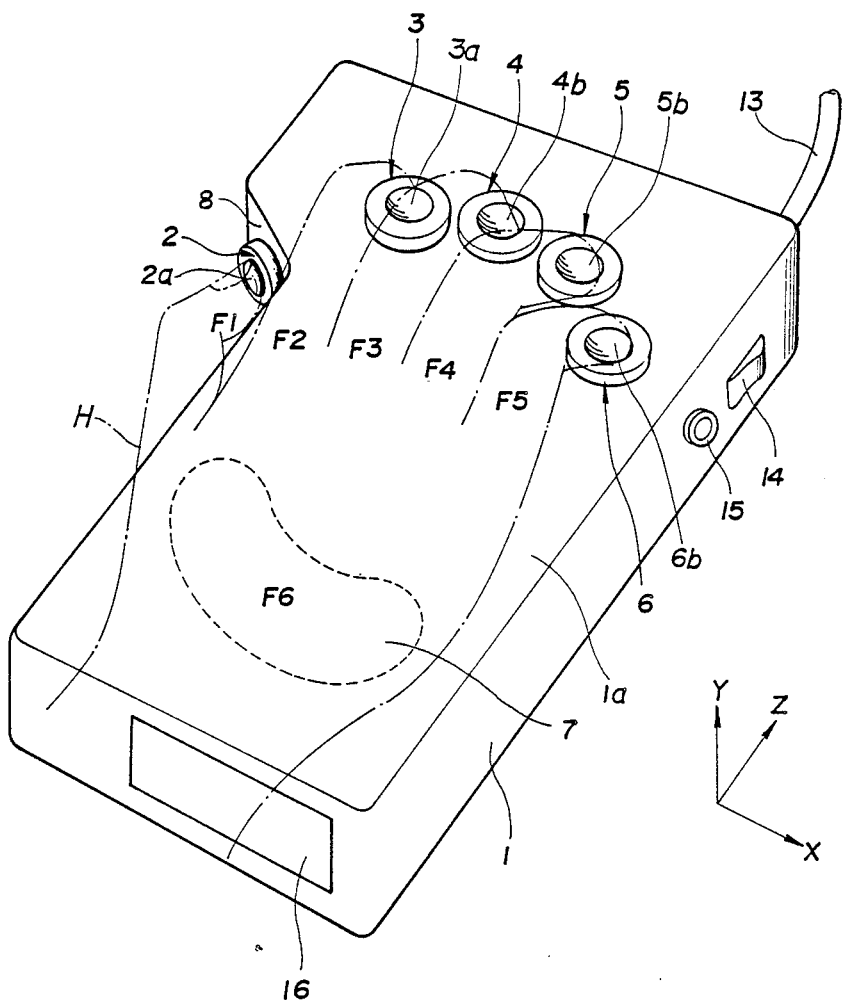
FIG. 1 is a perspective view schematically illustrating a keyboard of one embodiment of the present invention.

The keyboard according to the present invention, one embodiment of which is illustrated in FIGS. 1 through 3, can be operated with one hand. Particularly, the illustrated keyboard is operated with the right hand of an operator and is formed in the shape of a flat board. As a matter of course, a keyboard for the left hand can be formed by adopting a key arrangement opposite to that for the right hand.

In the drawings, reference numeral 1 denotes a keyboard base of the keyboard for use in an information processing device. The keyboard base 1 is provided with data-entering keys 2 to 6 and has an upper surface 1a and has a width nearly equal to that of a palm of the general-sized hand in a slightly spread state. On the front half part of the keyboard base 1, there are disposed the index-finger key 3, the middle-finger key 4, the ring-finger key 5 and the little-finger key 6. These keys 3 to 6 are somewhat separated apart from one another and disposed in a common plane and in a chevron with the middle-finger key 4 located at the apex of the chevron, so that the keys thus arranged correspond to the configuration of the hand in a physiological resting position The data-entering keys including the thumb key 2 are provided in the key tops 2a to 6a thereof with finger holes into which the fingertips of the corresponding fingers are allowed to be inserted. At a portion nearer to the operator than the aforesaid keys 3 to 6, there is a palm rest 7 for the palm F6 of the operator's hand.

On the left side of the keyboard base 1, there is formed a side stepped portion 8 having a front face substantially orthogonal to the upper surface 1a of the keyboard base 1. The side stepped portion 8 is arranged so that the index-finger key 3 is substantially behind the front face of the side stepped portion 8. The side stepped portion 8 is provided on the front face thereof with the thumb key 2. That is to say, the orthogonal center line c drawn through the center of the keytop 2a of the thumb key 2 is directed substantially to the index-finger key 3 as shown in FIG. 2. Thus, the keytops 3a to 6a of the respective keys 3 to 6 are approximately parallel to the upper surface 1a of the keyboard base 1 and the keytop 2a of the thumb key 2 is not parallel to the keytops 3a to 6a of the keys 3 to 6. Therefore, when the operator's hand rests on the keyboard base and the fingertips of the operator's fingers are inserted in the finger holes formed in the keytops of the corresponding keys, the hand and fingers of the operator naturally assume a physiological resting position in which the fingers are slightly spread out and the hand is completely relaxed thereby causing a substantially semispherical hollow space to be formed within the palm of the hand. In this resting position of the hand, the fingers F2 to F5 other than the thumb F1 are slightly bent inward and slightly separated from one another, and the thumb F1 points, substantially to the fingertip of the index-finger F2. The thumb pad is directed substantially orthogonally relative to the direction in which the finger pads of the other fingers are directed.

Each of the keys 2 to 6 are provided with a fulcrum-dispersed type switching mechanism composed of a plurality of dispersed electric contacts. To be specific, the thumb key 2 has a neutral position 2N at the center thereof and contacts 25L and 25R which are selectively made by moving the key in the direction of X (lateral direction) relative to the neutral position 2N, namely, in the directions of radial abduction and adduction (directions of 2L and 2R). The thumb key 2 can also be moved in the direction perpendicular to the palm of the hand (directions of palmar abduction and retroposition) so as to selectively actuate contacts 25D and 25U by moving the thumb key 2 in the direction of Z (directions of 2D and 2U) relative to the neutral position 2N. Since the thumb in the physiological resting position can move in all directions without the smallest strain, the thumb key 2 can be operated easily.

The keys 3 to 6 other than the thumb key 2 have neutral positions 3N to 6N at the middle points and make contacts when the fingers F2 to F5 are moved in the direction of Y (backward and forward directions), namely, directions of extension and flexion of the fingers (directions of 3U, 3D, 4U, 4D, 5U, 5D, 6U and 6D) as shown in FIG. 2. The index-finger key 3 may be provided with electric contacts which are actuated by moving the finger in the direction of X. Although the keys 4 to 6 other than the index-finger keys 3 are not necessarily moved in the Z-direction, it is preferable to permit these keys to be moved in that direction. The aforementioned contacts may be switching means 25U, 25D, 25R and 25L of a mechanical type as schematically illustrated in FIG. 3, or otherwise comprised of piezo-electric elements, etc. Also, switching means which can be operated by pushing the keys held in their neutral positions 3N to 6N in the direction perpendicular to the upper surface of the keyboard may be assembled in the keys 3 to 6 as required.

Furthermore, the keyboard base 1 has a cable 13 connected with an information processing device such as a word processor. As occasion demands, a power switch 14, a monitoring output terminal 15 for earphones and so on, and a holder or slot 16 for a memory cassette may be provided on the keyboard base 1.

The operation of the aforementioned keyboard will be explained hereinafter.

When the palm of the operator's hand F6 is put on the palm rest 7 of the keyboard in such a state that the fingers F1 to F5 are slightly spread out, the fingers assume the basic posture in which the fingertips touch or are close to the corresponding keys 2 to 6 held in their neutral positions 2N to 6N. In this case, the knuckle portions of the fingers are out of contact with the upper surface of the keyboard, base so as not to hinder the movement of the fingers.

In principle, key data to be delivered from this keyboard is discriminated by a combination of a key signal given via one of the contacts 25U, 25D, 25R and 25L and 2L of the thumb key 2 and another key signal from one or more of the contacts of the other keys 3 to 6 which are made by moving in the directions of 3U, 3D ... 6U, 6D.

According to the keyboard having the structure described above, the following effects are brought about.

(a) Since the keys 2 to 6 are arranged so as to allow the fingers in touch therewith to assume a physiological limb posture close to the resting position, the keying operation can be easily effected without the smallest strain on the muscles of the hand and fingers. A combination of swinging movements of the finger makes it easy to operate the keys to enter a large quantity of key data signals.

(b) Since the contact position of the thumb key 2 can be optionally elected from among the neutral position 2N and the contact positions 25U, 25D, 25R and 25L, a number of keys capable of delivering key data can be substantially increased, and key data to be inputted from the keyboard can be discriminated by pressing one of the keys 3 to 6 at the same time that the thumb key 2 is effected. Therefore, 404 kinds of key data $(=(5\times3\times3\times3\times3)-1)$ can be inputted at maximum, if the neutral positions 2N to 6N of all keys 2 to 6 are used as available keys effective during keying. However, if the keyboard is provided with switching mechanisms in which key data can be delivered by pushing down the keys 3 to 6 as in a conventional keyboard, 1279 kinds of key data $(=(5\times4\times4\times4\times4)-1)$ can be inputted at maximum.

(c) The keys 2 to 6 are arranged so that the fingers F1 to F5 can assume their natural postures and the musculature of the hand in its standby posture is strained very little. Therefore, the keying operation can be readily carried out by using in combination a plurality of the keys.

(d) The keys 3 to 6 other than the thumb key 2 are arranged on the keyboard in a chevron having the middle-finger key 4 as an apex, so that the fingers F2 to F5 other than the thumb F1 can assume their natural postures in an equiangular relationship when they are slightly spread out. Therefore, the fingers F2 to F5 can be moved in the same condition during keying.

(e) Because the keytop 2a of the thumb key 2 is perpendicular to the keytops 9 to 12 that are level with the upper surface of the keyboard base 1, the thumb key can be readily operated merely by subjecting the thumb to extension or flexion movement to operate the thumb key in the direction parallel to a upper surface of the keyboard base 1 (Y-direction). Besides, as occasion demands, the thumb key 2 may be provided with additional contacts which are vertically arranged relative to the neutral position thereof and a signal can be electrically established by subjecting the thumb to movement of palmar abduction or retroposition to move the thumb key in a direction perpendicular to the upper surface of the keyboard base 1 (Y-direction).

(f) Since the palm of the hand F6 can be put on the palm rest 7 so as to shore up the hand and arm of the operator, the operator will not become fatigued.

Figure 4:
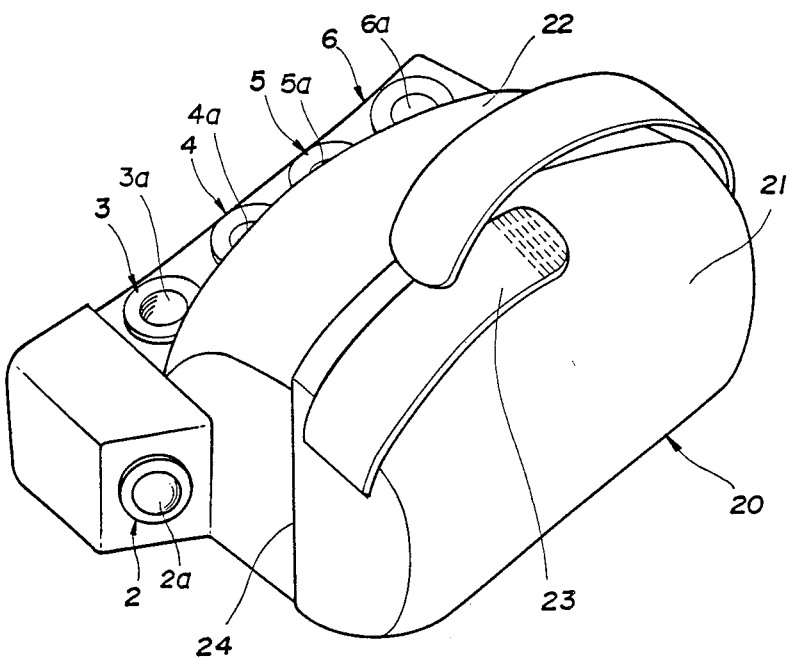
FIG. 4 is a perspective view schematically illustrating a second embodiment of the present invention.
Figure 5:
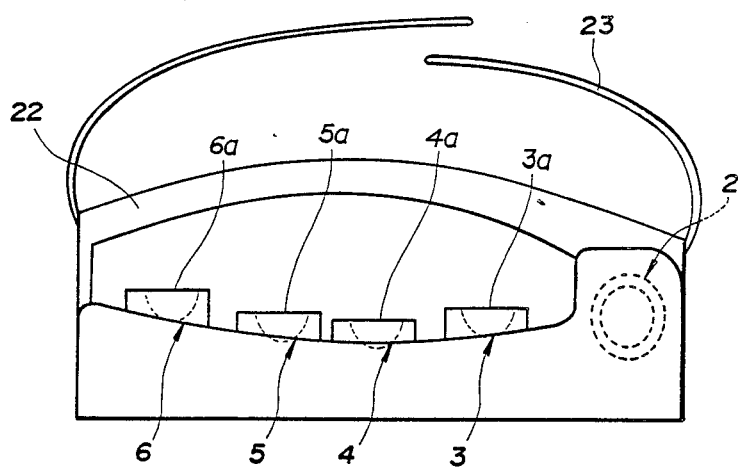
FIG. 5 is a side view of FIG. 4.

FIGS. 4 and 5 show a second embodiment of the keyboard for use in an information processing device according to the present invention.

The keyboard in this embodiment comprises a flat keyboard base 20 having its upper surface curved. The upper surface of the keyboard base 20 is provided with a palm rest 21 which is somewhat extended to complement the configuration of the palm and an intermediate portion 22 having its upper surface lower than the palm rest 21. The keys 3 to 6 other than the thumb key are arranged so that the keytop 4a of the middle-finger key 4 is lowest in comparison with those of the other keys, and the other keys 3, 5 and 6 are positioned on the sides of the middle-finger key 4 and have their keytops 3a, 5a and 6a higher than that of the middle-finger key 4. The thumb key 2 is disposed so that the orthogonal center line drawn through the center of the keytop 2a is directed substantially to the index-finger key 3.

In this embodiment, the palm rest 21 mentioned above is telescopically engaged with the intermediate portion 22 at a stepped portion 24. Moreover, on the palm rest 21, there may be disposed a set of retaining bands 23 for fastening the hand onto the keyboard According to this embodiment, the fingers can assume a suitable standby state in which the fingertips are naturally opposite to the keytops of the respective keys merely by putting the palm of the hand F6 on the palm rest 21 and slightly spreading the fingers. Furthermore, since the operator's hand is fastened to the keyboard by means of the retaining bands 23, the operator can carry about the keyboard to put it to practical use. Particularly, the keyboard of this structure has an advantage in that it permits keying operations to be performed comfortably because the phalanx portions of the fingers do not touch the intermediate portion 22 which is lower than the palm rest 21, and in that it can be fitted to hands of different sizes since the palm rest and the intermediate portion are telescopically engaged with each other.

Figure 6:
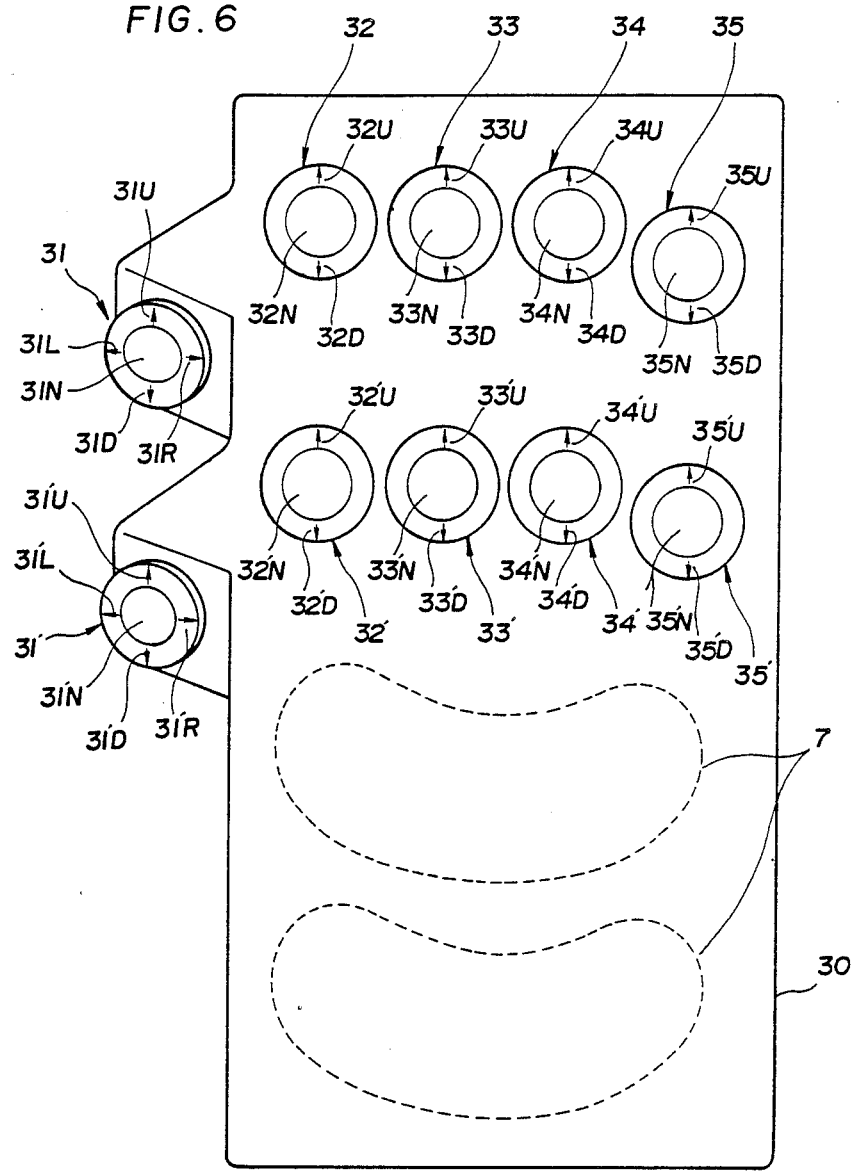
FIG. 6 is a plan view of a third embodiment of this invention.

FIG. 6 is a plan view illustrating a third embodiment of the keyboard according to the present invention.

In this embodiment, on the upper surface of a keyboard base 30, there are arranged a plurality of keys 32 to 35 for the fingers other than the thumb in a row in a lateral direction so that, when the palm of the hand is put on the palm rest 7 and the fingers are slightly spread out, the fingertips of the operator's hand are opposite to the keytops of the keys 32 to 35. On the underside of the row of keys 32 to 35, keys 32' to 35' for the fingers other than the thumb are arranged in the same state as the keys 32 to 35. Two thumb keys 31 and 31' are disposed on inclined surfaces at the side wall of the keyboard base 1 so that the fingertips of the operator's fingers are opposite to the respective keytops of the keys, when the fingers are naturally spread out, so as to facilitate the keying operation by the natural movement of the thumb.

According to this embodiment, by choosing one of the rows of keys 32 to 35 and 32' to 35' as a home position, 160 $(=((3\times3\times3\times3)-1)+((3\times3\times3\times3)-1))$ kinds of data can be inputted at maximum. In this case, since the thumb keys 31 and 31' can be moved in not only the direction perpendicular to the keytop surface thereof, but also in vertical and lateral directions relative to the keytop, they can be used as function keys capable of inputting 10 $(=2\times5)$ kinds of key data. Since the keytops of the thumb keys 31 and 31' are arranged on the inclined surfaces, the operator can readily operate the thumb keys by stirring his thumb.

Although the keyboard in this embodiment as illustrated is not provided with any specific function key, the thumb keys each having a plurality of switching contacts can be used as function keys. Furthermore, three or more thumb keys may be provided in the same manner as the aforesaid thumb keys.

Although only the keyboards operable with the right hand are illustrated in the drawings, a keyboard for the left hand can be formed merely by adopting a key arrangement opposite to that of the preceding embodiments and may be used together with the keyboard for the right hand.

Various modifications of the keyboard according to this invention can be accomplished by combining, in various ways, the components of the keyboard bases 1, 20, 30 in the aforementioned embodiments, i.e, the thumb keys 2, 31, 31' and the other keys 3-6, 32-35, and 32'-35'.

Figure 7:
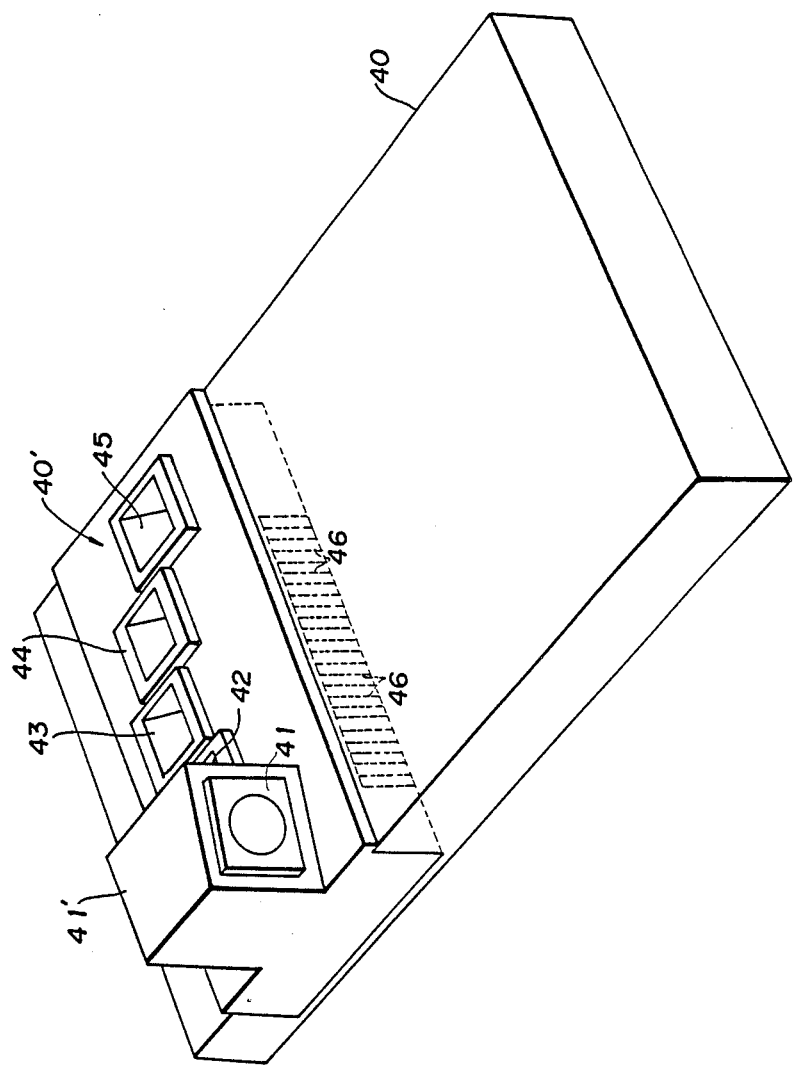
FIG. 7 is a perspective view of a fourth embodiment of this invention.

A fourth embodiment of the present invention will be described with reference to FIG. 7. A keyboard of this embodiment comprises a keyboard base 40 and a key unit 40' which is detachably fitted into a slot formed in the keyboard base 40. The key unit 40' is provided with a thumb key 41 and other finger keys 42 to 45 similar in structure to those in the preceding embodiments. The thumb key 41 is mounted on the front of a raised portion 41' of the key unit 40' so that the operator can naturally hit the thumb key 41 with his thumb while operating the other keys. An electrical connection between the keyboard base 40 and the key unit 40' is established by contact means 46 disposed on the opposite surfaces of the keyboard base 40 and the key unit 40'. According to this embodiment, if some key units having different sizes are prepared, the same-sized keyboard can be used by hands of different shapes and sizes by attaching a key unit of a suitable size to the keyboard base.

Figure 8:
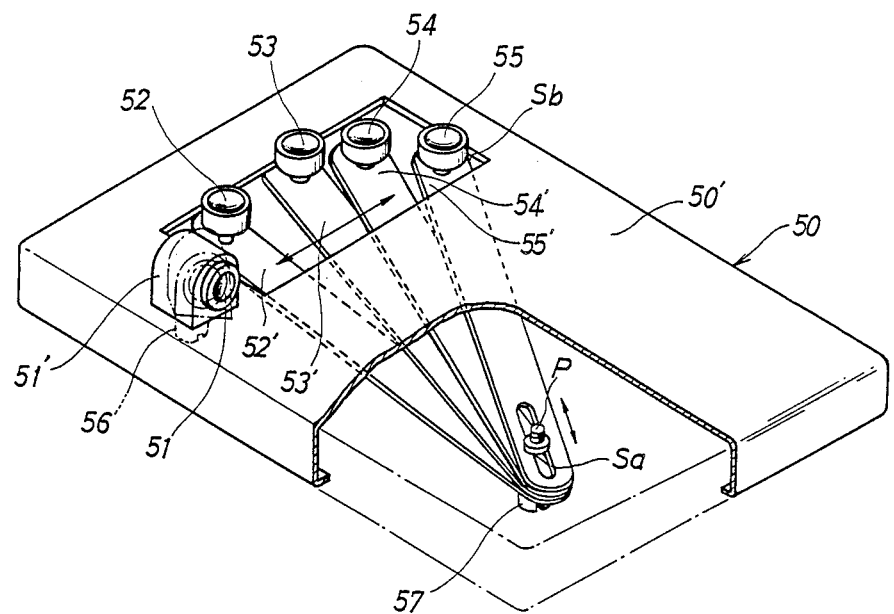
FIG. 8 is a perspective view of a fifth embodiment of this invention.

In addition, a keyboard capable of being fitted to hands of different sizes will be described as a fifth embodiment with reference to FIG. 8.

The keyboard of this embodiment is provided on the upper surface 50' of a keyboard base 50 with a thumb key block 51'. The thumb key block 51' is disposed rotatably at a position in which the fingertip of the operator's thumb is located when the hand and fingers of the operator rest on the keyboard base 50 in the resting position. On one side surface of the key block 51', there is disposed a thumb key 51. Keys 52 to 55 for the fingers other than the thumb are attached to the respective leading end portions of movable retainers 52' to 55' radially arranged and slidably supported at a point P opposite substantially to the thenar of the hand which rests on the keyboard base 50 in the physiological resting position. The appropriate position of the thumb key block 51' is selectively determined and fixed by a fixing screw 56. Thus, the movable retainers 52' to 55' each have a slot Sa for accommodating the fixing screw 57 retained at the point P, and the keys 52 to 55 mounted on the leading end portions of the movable retainers 52' to 55' can be arbitrarily fixed within an opening Sb formed in the upper surface 50' of the keyboard base 50. Along the slot Sa, the movable retainers 52' to 55' are movable in the longitudinal direction so that the length from the point P to the leading end of the respective movable retainers can be freely determined so as to be fitted to the operator's hand and the retainers can be fixed in place by the fixing screw 57.

Thus, since the direction of the thumb key 51 and the positions of the keys 52 to 55 other than the thumb key can be selectively changed, hands of different shapes and sizes can assume a physiological resting position merely by bringing the fingertips of the operator's fingers in touch with the respective keys.

As is clear from the above, the keyboard according to the present invention has a key arrangement based on human engineering, which allows the hand and fingers of an operator to rest thereon in a physiological resting position and swingingly move naturally to operate the keys without the smallest strain, thereby to reduce the impact on the fingers and facilitate a speed-up of the keying operation. Furthermore, this keyboard can be practically used similarly to a conventional keyboard having a large number of keys, since the keys each having a plurality of switching contacts which are effected by stirring the finger are disposed on the keyboard base. Besides, by the use of a thumb key changable in direction and keys changable in position, there can be provided a keyboard applicable to hands of different shapes and sizes which can allow the hand and fingers to rest on the keyboard in a physiological resting position.

Although the invention has been described in its preferred form with a certain degree of particularity, it is understood that the present disclosure of the preferred form can be changed as to the details of construction and the combination and arrangement of parts may be modified without departing from the spirit and the scope of the invention as hereinafter claimed.

What is claimed is:

1. A keyboard for inputting data into an information processing device, and which keyboard can be operated by an operator using one hand, said keyboard comprising:

a keyboard base having an upper curved concave surface at a front end thereof, and comprising an intermediate portion and a palm rest telescopically mounted to said intermediate portion, said intermediate portion being disposed between said palm rest and said upper surface at the front end, said palm rest and said intermediate portion each defining respective upper surfaces of said keyboard base that are curved convex surfaces, and the curved convex upper surface defined by said intermediate portion located at a level below the level at which the respective curved convex upper surface defined by said palm rest is located;

an index-finger key, a middle-finger key, a ring-finger key and a little-finger key mounted to said keyboard base and disposed on the upper surface at the front end thereof in a chevron with said middle-finger key being located at the apex of the chevron, said keys having respective keytops lying in planes parallel to a common plane;

a thumb key mounted to said keyboard base adjacent said index-finger key, said thumb key having a keytop lying in a plane perpendicular to said common plane, and the keytop of said thumb key being oriented relative to said index-finger key such that a center line extending orthogonal to the plane in which the keytop of said thumb key lies and passing through the center of the keytop of said thumb key is directed substantially towards said index-finger key, said finger keys disposed in said chevron and said thumb key so oriented relative to said index finger key being spaced apart from one another such that when one hand of an operator rests on said keyboard with the fingers thereof placed on the keytops of said finger keys and the thumb thereof placed on the keytop of the thumb key, the hand of the operators assumes a physiological resting position in which the hand is relaxed with the fingers thereof bent inward and slightly spread out and with the thumb pointing toward the finger tip of the index finger; and a plurality of electrical contacts operatively associated with each of said keys, the keytops of each of said keys being movable relative to said keyboard base in a plurality of directions into and out of contact with the plurality of electrical contacts operatively associated with said keys.

2. A keyboard as claimed in claim 1, wherein said electrical contacts are fulcrum-dispersed electric contacts.

3. A keyboard as claimed in claim 2, wherein the plurality of fulcrum-dispersed electric contacts operatively associated with said thumb key include two electric contacts disposed to respective sides of said thumb key, said two electric contacts being actuatable by said thumb key when the hand of an operator rests on said keyboard in the physiological resting position with the thumb thereof placed on the keytop of said thumb key and the thumb is moved laterally in directions of radial abduction and adduction, and two further electric contacts respectively disposed above and below said thumb key and which are actuatable by said thumb key when the hand of an operator rests on said keyboard in the physiological resting position with the thumb thereof placed on the keytop of said thumb key and the thumb is moved in directions of palmar abduction and retroposition.

4. A keyboard as claimed in claim 2, wherein the plurality of fulcrum-dispersed electric contacts operatively associated with each of said finger keys includes two electric contacts in front of and behind each of said finger keys, respectively, and which contacts are actuatable by each of said finger keys when the hand of an operator rests on said keyboard in the physiological resting position with the fingers thereof placed on the keytops of said finger keys and the fingers are moved in directions of flexion and extension.

5. A keyboard as claimed in claim 3, wherein the plurality of fulcrum-dispersed electric contacts operatively associated with each of said fingers keys includes two electric contacts in front of and behind each of said finger keys, respectively, and which contacts are actuatable by each of said finger keys when the hand of an operator rests on said keyboard in the physiological resting position with the fingers thereof placed on the keytops of said finger keys and the fingers are moved in directions of flexion and extension.

6. A keyboard as claimed in claim 1, further comprising a set of retaining bands for fastening the hand of an operator onto said keyboard base.

7. A keyboard for inputting data into an information processing device and which keyboard can be operated by an operator using one hand, said keyboard comprising: a keyboard base, a thumb key block disposed rotatably on said keyboard base and provided on one side surface thereof with a thumb key, movable retainers attached slidably to said keyboard base and having leading ends on which finger keys are respectively disposed, and connecting means connecting said retainers to said keyboard base for allowing said movable retainers to be slidable in longitudinal directions and movable in lateral directions so as to adjust in position the keys disposed on the leading ends thereof.

8. A keyboard as claimed in claim 7, further comprising a fixing screw adjustably mounting said thumb key block to said keyboard base, and wherein said movable retainers each have a slot defined therein, said connecting means comprises a fixing screw mounted to said keyboard base and extending through the slot in each of said movable retainers, and said keyboard base defines an opening in which said finger keys are exposed.

* * * * *